United States Patent
Anaya et al.

(10) Patent No.: US 10,379,998 B2
(45) Date of Patent: *Aug. 13, 2019

(54) EXPIRING HOOKS FOR COMPUTER APPLICATION DISCOVERY

(71) Applicant: INTERNATIONAL BUSINESS MACHINES CORPORATION, Armonk, NY (US)

(72) Inventors: Francisco M. Anaya, Hollister, CA (US); Seana Hogan, Valley Springs, CA (US); Trong Truong, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,880

(22) Filed: Nov. 6, 2017

(65) Prior Publication Data

US 2019/0087309 A1    Mar. 21, 2019

Related U.S. Application Data

(63) Continuation of application No. 15/708,542, filed on Sep. 19, 2017.

(51) Int. Cl.
*G06F 9/44*     (2018.01)
*G06F 11/36*    (2006.01)

(52) U.S. Cl.
CPC ...... *G06F 11/3612* (2013.01); *G06F 11/3636* (2013.01)

(58) Field of Classification Search
CPC .......................... G06F 11/3612; G06F 11/3636
USPC .......................................................... 717/128
See application file for complete search history.

(56) References Cited

U.S. PATENT DOCUMENTS

| 5,454,086 A * | 9/1995 | Alpert .................. G06F 9/4484 712/227 |
| 8,839,206 B2* | 9/2014 | Kalra .................... G06F 11/362 717/129 |
| 8,924,940 B2* | 12/2014 | Branson .............. G06F 11/3636 717/127 |
| 9,864,675 B2* | 1/2018 | Ug ...................... G06F 11/3688 |

(Continued)

OTHER PUBLICATIONS

Francisco M. Anaya et al "Expiring Hooks for Computer Application Discovery", U.S. Appl. No. 15/708,542, filed Sep. 19, 2017.
(Continued)

*Primary Examiner* — Anna C Deng
(74) *Attorney, Agent, or Firm* — Cantor Colburn LLP; William Kinnaman

(57) ABSTRACT

According to one or more embodiments a computer-implemented method includes detecting, by a processor, an instruction to capture runtime data of a set of instructions in a computer program, the instruction detected based on a hook associated with the set of instructions. The method further includes determining whether the hook is an active expiring hook. The method further includes in response to the hook being an active expiring hook, determining a time condition associated with the expiring hook. The method further includes in response to the time condition being met, capturing the runtime data of the set of instructions in the computer program.

5 Claims, 5 Drawing Sheets

(56) References Cited

U.S. PATENT DOCUMENTS

2010/0114915 A1* 5/2010 Gorton, Jr. .............. G06F 8/443
                                                              707/752

OTHER PUBLICATIONS

List of IBM Patents or Patent Applications Treated as Related; (Appendix P), Filed Nov. 6, 2017; 2 pages.

* cited by examiner

EXPIRING HOOKS FOR COMPUTER APPLICATION DISCOVERY

DOMESTIC PRIORITY

This application is a continuation of U.S. Non-Provisional application Ser. No. 15/708,542, entitled "EXPIRING HOOKS FOR COMPUTER APPLICATION DISCOVERY", filed Sep. 19, 2017, which is incorporated herein by reference in its entirety.

BACKGROUND

The present invention generally relates to an improvement to a computer system such as a system for debugging and capturing runtime data of a computer program product, and more specifically, to implementing expiring hooks.

New programs created by a user often include one or more inadvertent errors. Locating and removing the errors in a program is generally known in the industry as "debugging" the program, with errors being referred to as "bugs". Debugging a program can be difficult and time-consuming. In the prior art of debugging a program, a user may first read the program line-by-line to try and locate the errors. Following the flow of a program by reading it line-by-line is difficult, even for a relatively simple program.

Because debugging programs by reading them is so difficult, software debug commands executed by a software debug program may be utilized. Debug commands may be executed on the program and the user may observe the results as an aid to locate and correct any errors. For example, a user may go through the software program to be debugged and the user may insert a breakpoint in the program to halt execution whenever the line on which the breakpoint is set is encountered. The debug commands may then be executed on the user's program. In this example, the program will execute until a breakpoint is encountered. The execution of the program then will be stopped. The user may check register and other values after the breakpoint is encountered in order to evaluate the execution of the user program. This procedure is also very time-consuming when the software to be debugged is more than a few lines of code.

The problem of debugging user programs is magnified when software engineers are required to isolate and solve problems which occur in vast amounts of code with which the engineers have little or no previous experience. Often, standard regression tests written for the code may run successfully, but have a failure when the software is executed with slightly different parameters or environment settings.

A software program typically includes parameters which may be set by a user prior to executing the software program. The software program may execute correctly when a standard set of parameters is utilized, and thus, the standard regression tests may run successfully. The same software program may execute incorrectly when a slightly different set of parameters is utilized. Thus, the software engineer may be faced with a difficult problem which must be solved in a short amount of time.

Further yet, the debugging tools are used for capturing runtime data of the computer program, such as code coverage, number of executions of specific instructions, path frequency, and other such metrics. However, debugging tools use significant overhead to capture such information because the debugging tools have to stop execution of the computer program, capture the information, and resume the computer program again. Performing such operations for each instruction, or multiple instructions in the computer program substantially affect the performance of the computer program.

SUMMARY

According to one or more embodiments a computer-implemented method includes detecting, by a processor, an instruction to capture runtime data of a set of instructions in a computer program, the instruction detected based on a hook associated with the set of instructions. The method further includes determining whether the hook is an active expiring hook. The method further includes in response to the hook being an active expiring hook, determining a time condition associated with the expiring hook. The method further includes in response to the time condition being met, capturing the runtime data of the set of instructions in the computer program.

According to one or more embodiments a system includes a memory; and a processor. The processor executes a computer program and measure runtime data of one or more instructions of the computer program. In one or more examples, the execution includes detecting an instruction to capture runtime data of a set of instructions in the computer program, the instruction detected based on a hook associated with the set of instructions; determining whether the hook is an active expiring hook; in response to the hook being an active expiring hook, determining a time condition associated with the expiring hook; and in response to the time condition being met, capturing the runtime data of the set of instructions in the computer program.

According to one or more embodiments a computer program product includes a computer readable storage medium having program instructions embodied therewith, the program instructions executable by a processing circuit to cause the processing circuit to execute a first computer program and measure runtime data of one or more instructions of the first computer program. In one or more examples, the execution and capture includes detecting an instruction to capture runtime data of a set of instructions in the computer program, the instruction detected based on a hook associated with the set of instructions; determining whether the hook is an active expiring hook; in response to the hook being an active expiring hook, determining a time condition associated with the expiring hook; and in response to the time condition being met, capturing the runtime data of the set of instructions in the computer program.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
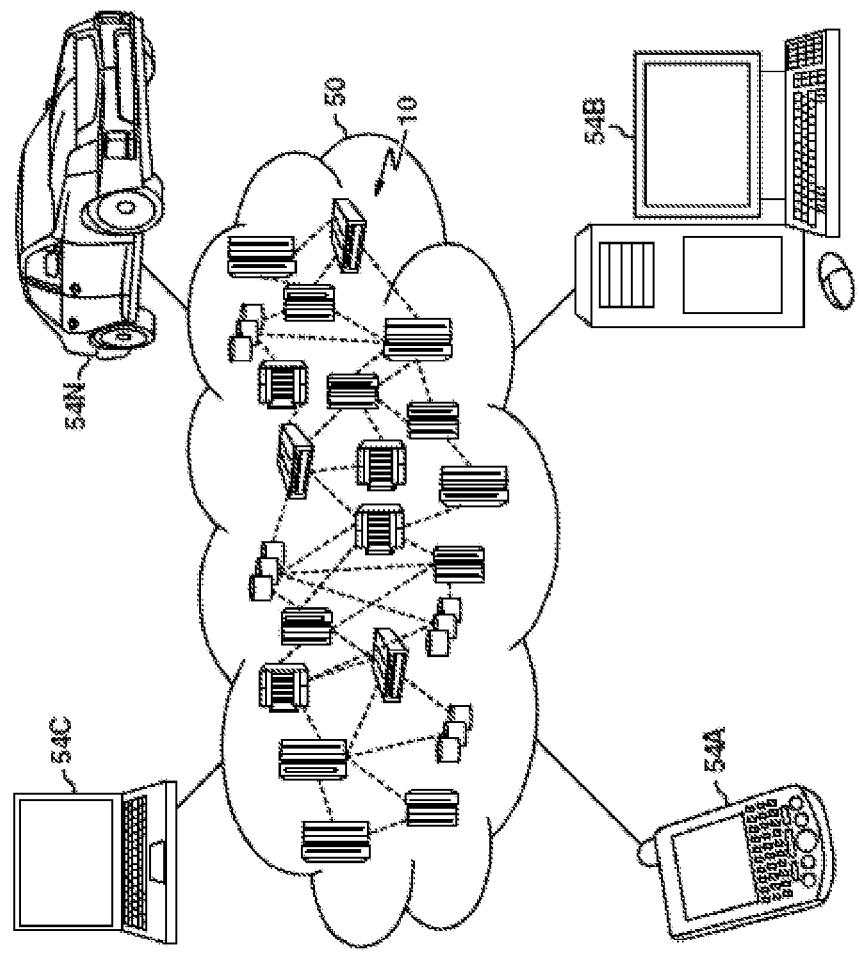
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The technical solutions described herein facilitate a runtime data capture system to provide to users, such as engineers, software developers, or other personnel with information regarding how program code of a system under test (SUT) is processing regarding performance, debugging and overall flow and understanding of the program code. The system under test includes a computer program product or any other product that includes a computer program of which the performance and runtime data are to be observed and/or measured.

For example, consider an application consisting of several compile units (CUs) such as CU1, CU2, CU3 . . . CUn; and suppose a user is interested in statement frequency data for CU1 in his application. Statement frequency indicates a number of times a statement (or a program instruction in the CU1) executes during runtime, that is, during a typical operation of the system under test. Typically, performance measurement systems collect such runtime data using hooks (or debug events/points), but the hooks that allow the frequency count to be incremented on each statement execution are in place on each statement the entire time the system under test is deployed. Thus, every time CU1 is entered, processing is redirected at each statement creating significant overhead. Because of this, statement frequency hooks are rarely used in production, although the statement frequency data is quite useful for analyzing the performance of the system under test. Thus, such overhead associated with using hooks for capturing runtime data such as statement frequency is a technical challenge that prevents users from collecting and analyzing such data.

The technical solutions described herein address such technical challenges using expiring hooks. With expiring hooks, described herein, runtime data, such as statement frequency hooks are set with a timer, which expires and frees the overhead at expiration. Further, the expiration hooks are associated with temporal parameters that facilitate the technical solutions herein to facilitate a runtime data capture system to monitor the SUT at specific times and at specific frequencies according to the parameters. Thus, the technical solutions herein cause the overhead for a limited number of runs of the SUT, and in turn, improves the performance of runtime data capture of the SUT.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
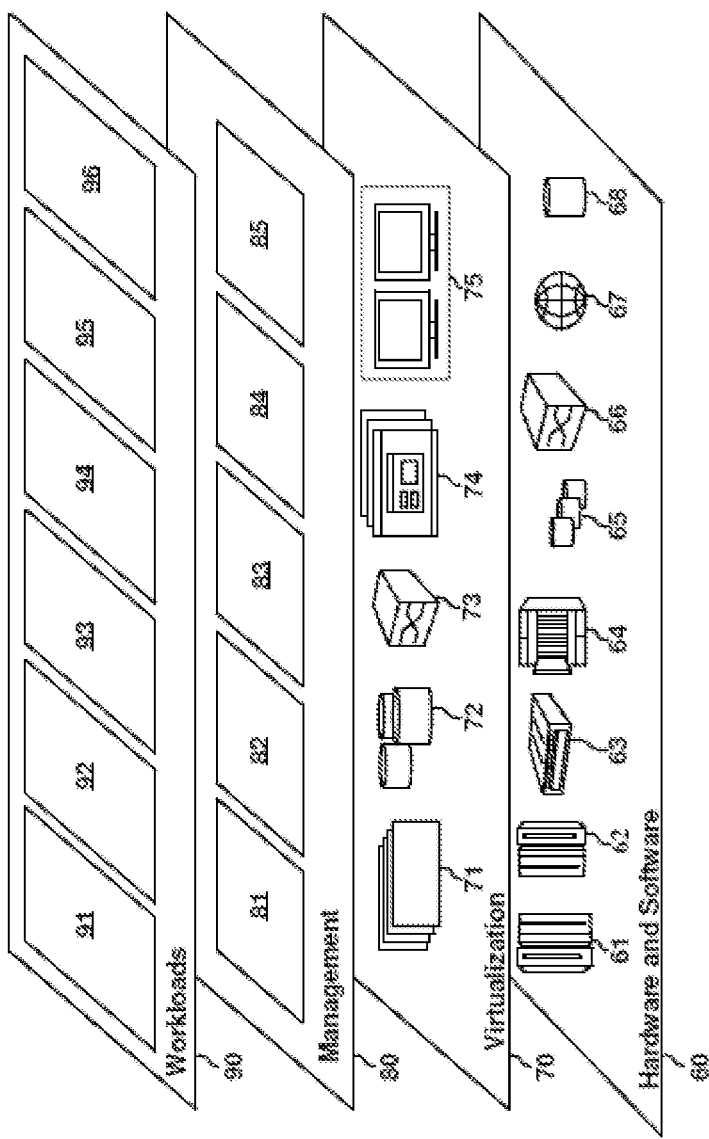
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capturing runtime data of a system under test 96.

Figure 3:
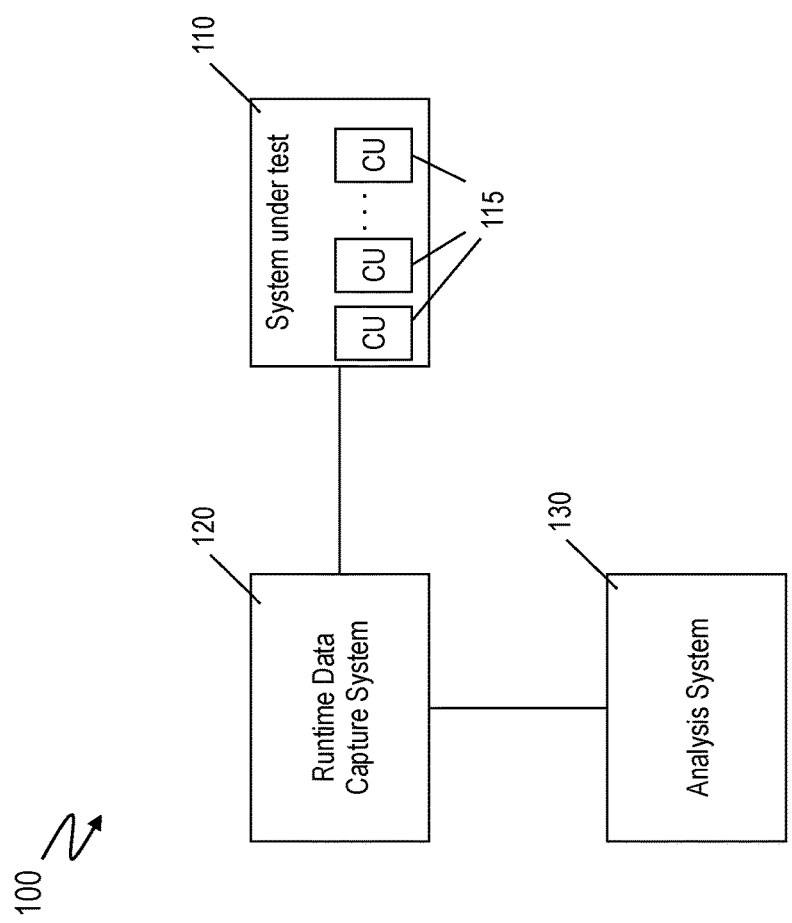
FIG. 3 depicts an example system 100 for capturing runtime data of a system under test according to one or more embodiments of the present invention.

FIG. 3 depicts an example system 100 for capturing runtime data of a system under test according to one or more embodiments of the present invention. The system under test (SUT) 110 is monitored by a runtime data capture system 120. In one or more examples, the runtime data capture system 120 forwards the captured runtime metrics of the SUT 110 to an analysis system 130. It should be noted that in one or more examples, the runtime data capture system 120 and the analysis system 130 are part of a single system, although depicted separately here. In one or more examples, the runtime data capture system 120 saves the captured runtime data in its entirety in a format that is consumable by the analysis system 130. The analysis system 130 analyzes the runtime information from the runtime data capture system 120 to provide a performance measurement and other application specific runtime data (e.g. program data values) of the SUT 110. For example, the analysis system 130 generates charts, reports, and other such user interface elements for the users to check if the performance of the SUT 110 is satisfactory. It should be noted that the runtime data captured is not limited to performance; for instance, a frequency data coupled with variable data can be used to provide valuable information for program refactoring purposes. Other examples are also possible.

The SUT 110 is a product that includes a computer program product that includes one or more computer executable instructions. The computer program product of the SUT 110 includes one or more compile units (CUs) 115. Each CU 115 is a separate computer program that is part of the computer program product, and each CU 115 includes one or more computer executable instructions. In one or more examples, each CU 115 may be a separate computer file. Alternatively, or in addition, multiple CUs may be part of a common file, for example as classes, or functions, or any other portion of a computer program depending on the computer programming language being used. It should be noted that the technical solutions described herein are applicable to any computer programming language used for the instructions of the computer program product of the SUT 110.

The performance of the computer program product is measured by the runtime data capture system 120. In one or more examples, the runtime data capture system 120 is also a debugging system that facilitates identifying bugs in the computer program product or other components of the SUT 110. The runtime data capture system 120 monitors specific instructions in the CUs 115 that are marked using hooks. For example, hooks are used to intercept processing within a CU 115. Hooks are instructions that overlay an original instruction in the CU 115 and redirect processing to perform a task related to collecting information about the processing of the CU 115, particularly the marked one or more instructions from the CU 115. The purpose of these hooks is to obtain information about a program while it is processing. Generally, hooks are not employed with running production code because of associated intrinsic overhead described herein. The runtime data capture system 120 addresses the technical challenge by using expiring hooks.

Figure 4:
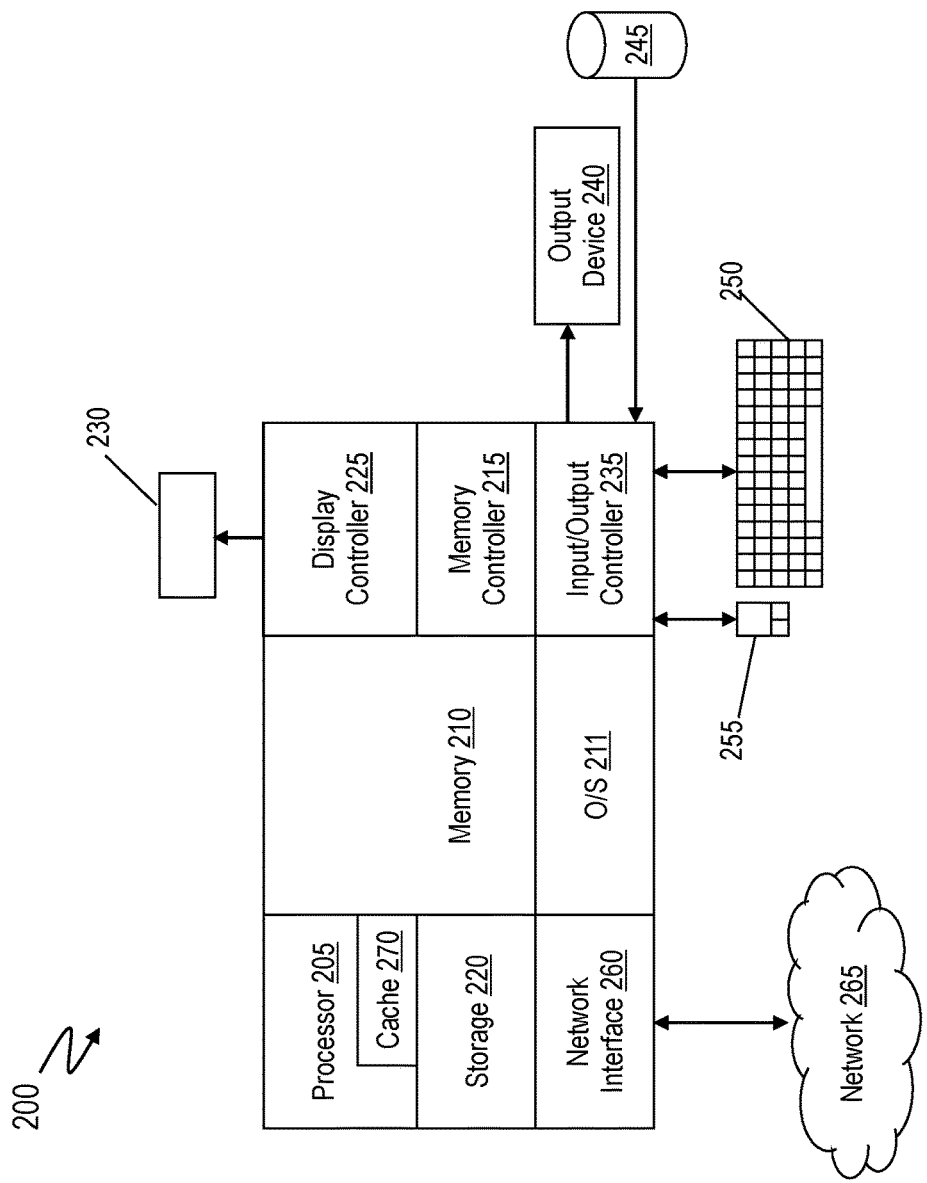
FIG. 4 illustrates an example system 200 according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 300 includes hardware, such as electronic circuitry. In one or more examples, the system 200 is the runtime data capture system 120.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

In one or more examples, the runtime data capture system 120 communicates with the SUT 110 and the analysis system 130 using the network 265. Alternatively, or in addition, the runtime data capture system 120 communicates with the SUT 110 and the analysis system 130 using any other manner of communication. In one or more examples, the runtime data is output to a file in a format consumable by the analysis system 130, the file being sent to the analysis system using the network 265, for example.

Figure 5:
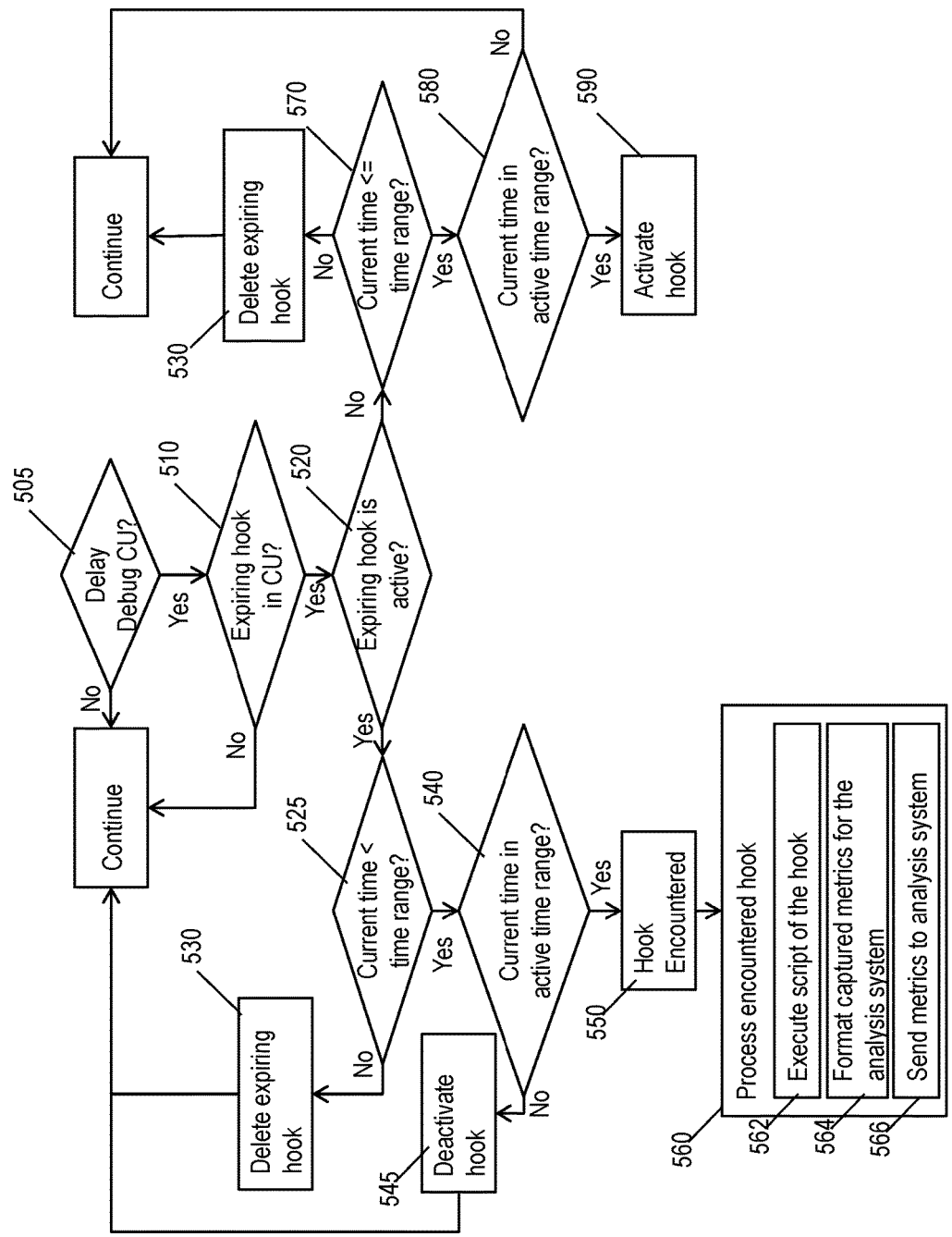
FIG. 5 illustrates a flowchart of an example method for capturing runtime data of the SUT using expiring hooks according to one or more embodiments of the present invention.

FIG. 5 illustrates a flowchart of an example method for capturing runtime data of the SUT using expiring hooks according to one or more embodiments of the present invention. The runtime data capture system 120 implements the method described herein.

In one or more examples, the runtime data capture system 120 determines if it is operating in a delay debug mode, as shown at block 505. For example, the runtime data capture system 120 starts a debug session for capturing at the first entry compile unit of an initial load module of the computer program product. In one or more examples, if the CU 115 for which the performance measurements are to be captured does not get initiated right away after the computer program product initiates, the runtime data capture system 120 facilitates using the delay debug mode. In this case, the delay debug mode delays starting of the debug session until the runtime data capture system 120 recognizes the CU 115 for which to capture the metrics. The runtime data capture system 120 is in a dormant state during the delay debug mode and monitors only a few events. When the runtime data capture system 120 recognizes the CU 115, the runtime data capture system 120 comes out of the delay debug mode, completes the initialization, and starts the debug session for capturing runtime data.

The method further includes detecting if expiring hooks are associated with one or more instructions in the CU 115 to capture runtime data of the one or more instructions, as shown at block 510. For example, an expiring hook may be associated with a single instruction. Alternatively, or in addition, an expiring hook may be associated with multiple instructions, such as a function, or any other collection of instructions in the CU 115.

Thus, the expiring hook is itself an instruction embedded in the computer program product associated with a section of the CU 115, the instruction being for the runtime data capture system 120 to capture runtime data associated with the section. In one or more examples, the expiring hook indicates what runtime data are to be captured. For example, the expiring hook specifies that a statement frequency, path frequency, or other such runtime data are to be captured for the section of the CU 115.

The expiring hook further specifies one or more time parameters. The time parameters include a time-range for which the expiring hook is to be used. The time parameters further include a time at which to activate the expiring hook during the time range. Further, the time parameters include an activated duration that specifies a duration for which the expiring hook is to be activated.

An example of the expiring hook looks like:
SET FREQUENCY ON, CU=CU1, START=0605201700:00, END=0615201700:00, EVERYHOURS=5, FOR=15;

In this example, the expiring hook is associated with the CU1 115, and has a time range between Jun. 5, 2017, and Jun. 15, 2017, beginning and ending at midnight. The expiring hook is activated every five hours, with activate frequency hooks for 15 minutes. Thus, when CU1 115 is loaded, the remote data capture system 120 determines if CU1 115 is eligible for expiring hooks, and if so, reads the commands for setting the hooks and invokes code to set the hooks and timers. The expiring hooks are only active for 15 minutes every five hours for 10 ten days and information data is collected during these intervals. In this example, at midnight on Jun. 15, 2017, the expiring hooks are deleted. It should be noted that the above is just one example of an expiring hook and that in other examples the expiring hooks can be implemented in other ways.

Referring back to the FIG. 5, the method further includes determining if the expiring hook is active, as shown at block 520. The expiring hook is active if the current time meets the active time range specified by the time parameters of the expiring hook. If the expiring hook is active, that is the current time is in the active time range, the remote data capture system 120 checks if the expiring hook as expired, as shown at block 525. The expiring hook is deemed expired when the current time passes the time range associated with the expiring hook, for example, Jun. 15, 2017, in the above example.

If the expiring hook has expired, the remote data capture system 120 deletes the expiring hook from the CU 115, as shown at block 530. For example, the instruction for the expiring hook is deleted, so that the remote data capture system 120 does not detect the expiring hook during next execution.

The remote data capture system 120 further determines that the current time is in the active time range of the active expiring hook, as shown at block 540. If the current time is out of the active time range, the remote data capture system 120 deactivates the expiring hook, as shown at block 545.

Deactivating an expiring hook includes not processing the expiring hook, that is, in other words, not capturing the runtime data specified by the expiring hook. Alternatively, if the current time is still within the active time range, the remote data capture system 120 deems that the expiring hook is encountered, as shown at block 550.

The remote data capture system 120 proceeds to process the expiring hook and capture the runtime data specified, as shown at block 560. In one or more examples, the processing is performed according to an input file associated with the expiring hook, where the input file provides one or more scripts to execute to capture the runtime data, as shown at block 562. For example, the script for capturing statement frequency is different from a script for capturing path frequency. In one or more examples, the processing further includes sending the captured runtime data to the analysis system 130, as shown at block 566. In one or more examples, the captured metrics are formatted according to the analysis system 130 being used, as shown at block 564. It should be noted that in one or more examples, the captured runtime data is sent to the analysis system 130 after all data is collected, and not at each expiring hook. Instead, at each expiring hook, the data may be stored in a file or any other collection for sending the final runtime data to the analysis system 130.

Alternatively, in case the expiring hook is not active, the method includes checking if the current time is in the time range of the expiring hook, as shown at block 570. If the current time is past the time range of the expiring hook, the remote data capture system 120 proceeds to delete the expiring hook, as shown at block 530. If the current time is still within the time range of the expiring hook, the method further includes determining if the current time is within the active time range of the expiring hook, as shown at block 580. If the current time is within the active time range, the expiring hook is activated, as shown at block 590, else the execution is continued.

In one or more examples, upon activating the expiring hook, the remote data capture system 120 processes the expiring hook, as shown at block 560. Alternatively, the remote data capture system 120 encounters the activated expiring hook in the next execution, as described in the method above.

The technical solutions described herein facilitates implementing expiring hooks with specified time parameters to capture runtime data of a computer program product. The technical solutions described herein facilitates collecting runtime data with reduced overhead and thus an improved performance of a debugging system. Thus, the technical solutions herein facilitate improvements to computer technology. The runtime data captured are further used to improve the computer program product that is under observation by analyzing the captured metrics.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

detecting, by a processor, an instruction to capture runtime data of a set of instructions in a computer program, the instruction detected based on a hook associated with the set of instructions, the hook having one or more time parameters indicating at least an active time range specifying dates and times between which to capture the runtime data and indicating a duration for which to capture the runtime data;

determining whether the hook is an active expiring hook based on the one or more time parameters;

in response to determining the hook being an active expiring hook, determining a time condition associated with the active expiring hook, wherein determining the time condition associated with the active expiring hook comprises determining whether current time is in the active time range and the current time is in the duration to capture the runtime data based on the one or more time parameters;

in response to determining the current time is in the active time range and is in the duration to capture the runtime data, capturing the runtime data of the set of instructions in the computer program;

in response to determining the current time is in the active time range and is not in the duration to capture the runtime data, deactivating the active expiring hook from the computer program; and in response to determining the current time is not in the active time range and the current time passed an expiration time associated with the active expiring hook, deleting the active expiring hook from the computer program by deleting the instruction to capture the runtime data.

2. The computer-implemented method of claim 1, wherein the time condition specifies a frequency at which to capture the runtime data.

3. The computer-implemented method of claim 1, wherein the runtime data comprise a statement frequency.

4. The computer-implemented method of claim 1, wherein the runtime data comprise a path frequency.

5. The computer-implemented method of claim 1, wherein determining whether the hooks is active comprises:
   identifying a time-interval associated with the expiring hook; and
   determining that current time is in the time-interval.

* * * * *